United States Patent Office 2,851,073
Patented Sept. 9, 1958

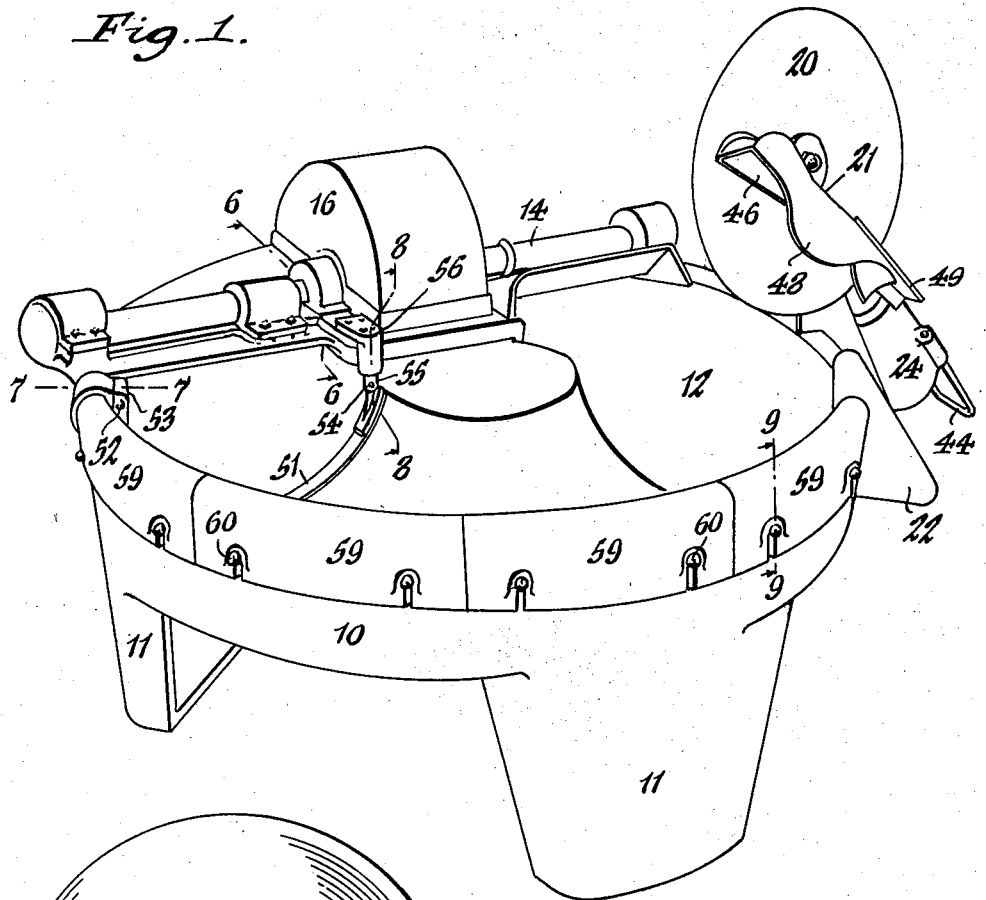

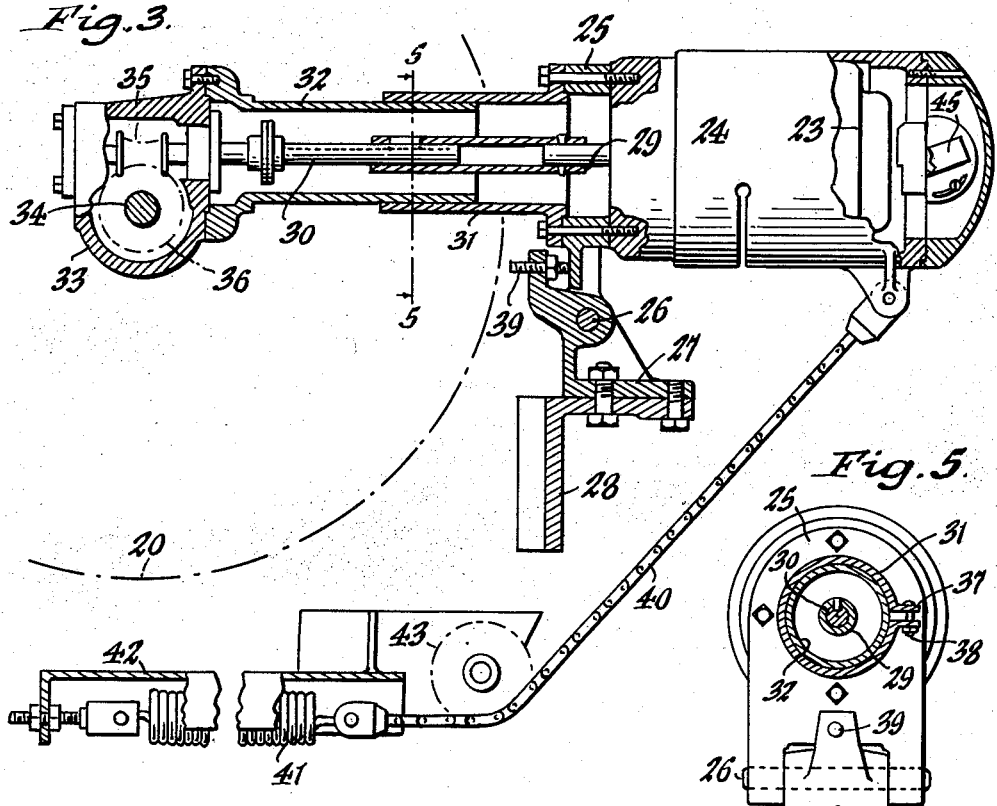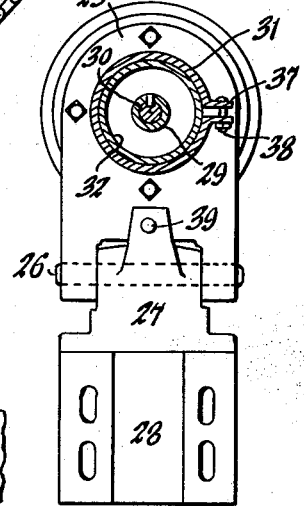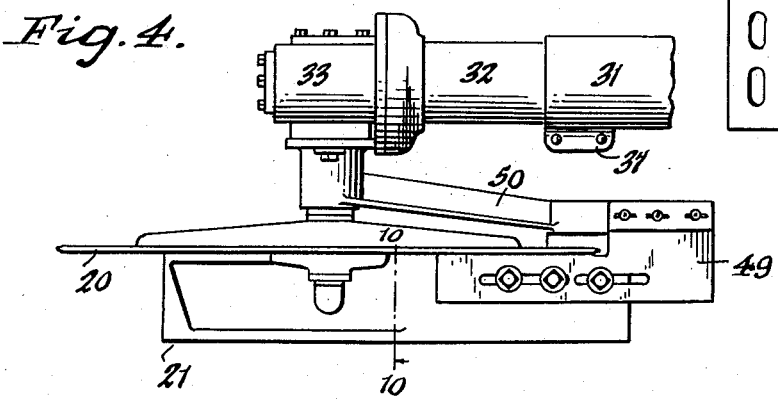

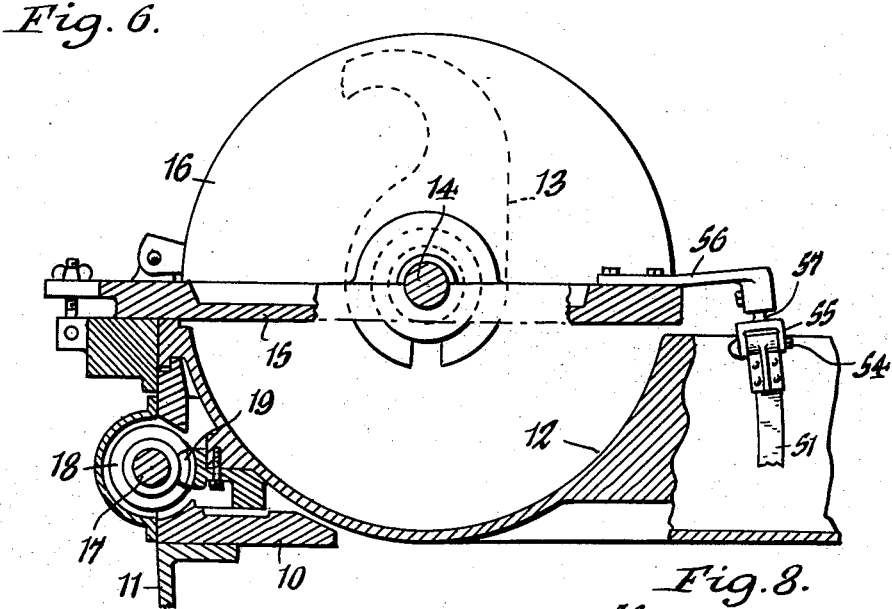
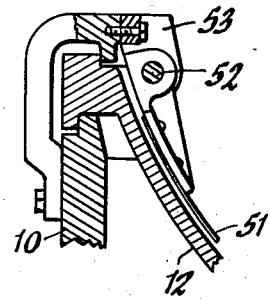
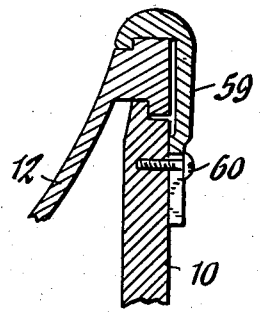
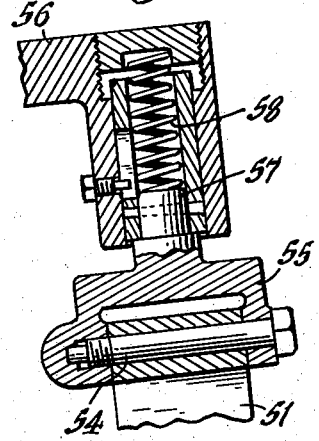
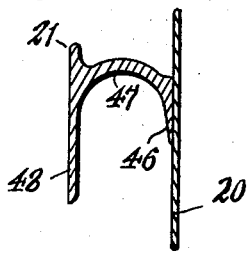
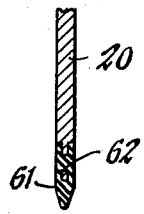

2,851,073

MEAT CUTTING MACHINE HAVING UNLOADING DISC AND FLEXIBLE BOWL SCRAPER

Harold E. Schaller, Buffalo, N. Y., assignor to John E. Smith's Sons Company, Buffalo, N. Y., a corporation of New York Application March 15, 1954, Serial No. 416,076

4 Claims. (Cl. 146—67)

This invention relates to certain new and useful improvements in meat cutting machines of the type employed by packers for cutting sausage meat.

One of its objects is to provide a machine of this character which is so designed and constructed as to provide efficient and reliable means for directing and discharging the meat over the side of the meat bowl and effecting the emptying of its contents in a minimum period of time.

Another object of the invention is to provide an unloader assembly for the rotary bowl type of meat cutting machines which is vertically movable to and from an operative position within the bowl, which is readily adjustable to different sized machines, and which employs means for automatically starting and stopping the unloader at predetermined times in its movement to and from operative relation to the bowl, to thereby afford maximum safety to the operator.

Other features of the invention reside in the construction and arrangement of parts hereinafter described and particularly pointed out in the appended claims.

In the accompanying drawings:

Figure 1 is a perspective view of the meat cutting machine embodying my improvements, the unloader assembly being in its inoperative position. Figure 2 is a fragmentary perspective view showing the unloader assembly in its operative position. Figure 3 is an enlarged fragmentary longitudinal section of the unloader supporting and drive assembly. Figure 4 is a top plan view of the unloader disk and plow assembly. Figure 5 is a cross section taken on line 5—5, Figure 3. Figures 6, 7, 8 and 9 are enlarged cross sections taken substantially in the planes of the correspondingly numbered lines in Figure 1. Figure 10 is a cross section taken on line 10—10, Figure 4. Figure 11 is a fragmentary cross section of the unloader disk having a rubber edge at its periphery.

Similar characters of reference indicate corresponding parts throughout the several views.

By way of example, my invention has been shown in connection with a meat cutting machine consisting of a circular frame or bed ring 10 supported on legs 11, a meat bowl 12 having a solid center plug rotatably mounted within the bed ring, and a rotary cutter 13 extending into the bowl and mounted on a transverse shaft 14 journaled in suitable bearings carried by a cover plate 15 arranged over the rear portion of the bowl. A hood 16 is provided for enclosing the cutter. Rotation of the bowl is effected from a motor-driven shaft 17 suitably journaled on the bed ring and having a worm 18 thereon meshing with a worm wheel 19 suitably secured to the lower portion of the bowl.

The unloader assembly for effecting the discharge of the cut meat over the side of the bowl 12 is preferably constructed as follows:

This unloader assembly is located radially in overhanging relation at one side of the machine forwardly of the cover plate 15 and is mounted for vertically-swinging movement into and out of registering operative relation to the meat bowl, the same consisting of a revolving unloader disk 20 disposed generally radially and somewhat obliquely relatively to the bowl in its lowered operative postiion for intercepting and directing the meat by centrifugal force in a direction outwardly of the bowl, and a plow-like member 21 disposed alongside the disk in operative relation thereto to strip any meat from the face of the disk as well as to convey and direct it outwardly over the side of the bowl and onto a suitable chute 22 provided to receive and guide the meat to a point of discharge. The unloader disk is driven by an electric motor 23 arranged within a housing 24 attached endwise at its inner end to a vertically-swinging, ring-like support 25 fulcrumed at 26 to a bracket 27 bolted or otherwise secured to a main supporting bracket 28 applied to the bed ring 10. Connected to the motor-shaft are axially-adjustable or telescoping shaft-sections 29, 30 and enclosing these sections are similarly adjustable inner and outer housing tubes or arm sections 31, 32, the housing tube 31 being secured to the ring-like support 25 and the companion housing-tube terminating in a bearing housing 33 in which a transverse shaft 34 is journaled and to which the unloader disk 20 is keyed. Motion is transmitted to this disk-shaft from the electric motor and shaft sections 29, 30 through the medium of a worm 35 and worm wheel 36, the lower side of the disk rotating in a direction outwardly and upwardly in relation to the bowl-trough. The housing tube 31 serves to clamp the companion disk-bearing tube 32 in its axially and radially adjusted postiion to locate the unloader disk in proper registering and oblique relation to the trough of the bowl and for this purpose such clamping tube is partially slit lengthwise and has ears 37 formed thereon to receive a clamping bolt 38. An adjustable stop 39 is applied to the upper end of the bracket 27 in the downward swinging path of the ring-like motor support 25 to arrest the unloader assembly in its proper horizontal operative position overhanging one side of the bowl. For the purpose of facilitating the manual movement of the unloader assembly into and out of operative relation to the bowl and cushioning its downward movement as well as retaining it in its upward inoperative position, I provide a flexing or yielding connection between the motor-housing 25 and the bed ring 10 consisting of a chain 40 pivoted at one end to such housing and at its other end to one end of a horizontally-disposed spring 41 suitably connected to a bracket 42 applied to the underside of the bed ring. The intermediate portion of this chain adjacent its connection to the spring passes over a sprocket 43 mounted on the adjoining end of the bracket 42. A bail-like handle 44 is provided at the outer end of the motor-housing and is used by the operator in moving the unloader assembly to and from its operating position.

A mercury switch 45 is included in the circuit of the unloader disk driving motor 23 and is mounted in the outer end of the motor-housing 24 to automatically control the starting and stopping of the motor at predetermined times in the movement of the unloader assembly to and from its operative position.

The plow-like unloading member 21 which is disposed along the front or meat-engaging side of the unloader disk 20 and below its axis, is of elongated channel or downwardly-opening scoop-like shape and bears at its inner side 46 against the face of the disk to strip the meat cleanly therefrom, while its top wall 47 guides and directs the meat laterally and outwardly over the side of the bowl. The outer side 48 of the plow member is convexly curved at its lower edge and constitutes a deflecting baffle for intercepting and directing the upper layer or portion of the meat in the bowl outwardly over its side and onto the chute 22 which is bolted or otherwise attached to the adjoining portion of the bed ring. The inner face of the top wall of this plow member is transversely curved and the baffling side 48 jointly with the disk serves to control the flow of the meat in a manner to effect the total evacuation of the meat from the bowl. This plow-like member is mounted for joint swinging movement with the unloader disk and for independent radial adjustment relative to the bowl by bolt and slot connections on a plate-like bracket 49 which in turn is secured to the outer end of a radial arm 50 extending along the rear face of the unloader disk and secured to the adjoining end of the bearing-housing 33.

Disposed for operative scraping engagement with the bowl-trough and generally diametrically opposite the unloading assembly is a semi-circular, radial scraping blade 51 pivotally-joined at 52 at its outer end to a yoke-shaped bracket 53 secured to the adjoining side of the bed ring 10. The opposite or inner end of the blade is pivotally joined at 54 to a yoke-shaped fitting 55 which is yieldingly suspended from a bracket-arm 56 secured to the adjoining portion of the cover plate 15. This fitting has a stem 57 rising therefrom which is guided for limited vertical movement in the bracket-arm and a spring 58 housed in the latter and abutting said stem constantly urges the fitting downwardly to thereby bring the scraper in tensioned scraping engagement with the trough of the bowl.

That portion of the rim of the meat bowl 12 not concealed or covered by the plate 15 is provided with a guard means consisting of a plurality of arcuate sections 59 disposed in end to end fashion and secured by bolts 60 to the outer face of the bed ring. The upper ends of these sections are curved to extend over the top and inner peripheral edge of the bowl to thereby provide a safe-guard for the operator and effectually provide a fixed bearing or support for kettles and the like which may be used in conjunction with the operation of the machine and may be liable to come in contact therewith.

In Figure 11 the unloader disk 20 is provided with a peripheral rim or edge 61 of rubber which is molded directly to the disk, the latter having an annular row of openings 62 therein into which the rubber flows to effectually retain the rim to the disk. This rubber rim protects the trough-face of the meat bowl and makes for closer adjustments of the disk to insure complete removal of the meat from the bowl.

I claim as my invention:

1. In a meat cutting machine having a bowl revolvable about a vertical axis and having a concentric trough which is generally semicircular in cross section, and a bed rotatable supporting said bowl and having a portion arranged adjacent the outer rim of said trough; the combination therewith of an unloading assembly for removing the materials in said trough while said bowl is revolving, comprising an inner arm section, a generally horizontal pivot pin mounted on said portion of said bed horizontally outwardly of said bowl and pivotally supporting said inner arm section to swing in a generally vertical radial plane with reference to said bowl, an outer arm section revolvably secured to said inner arm section to revolve about the longitudinal axis of said inner arm section, a flat disk revolvably mounted on said outer arm section with its periphery conforming to said semi-circular trough and with its axis arranged at an acute angle to the horizontal whereby said flat disk is arranged obliquely in said trough, the degree of obliquity of said acute angle being adjusted by revolving said outer arm section about said longitudinal axis of said inner arm section, means arranged to fix said outer arm section with reference to said inner arm section at different selected positions of rotation about said longitudinal axis of said inner arm section, a plow carried by one of said arm sections and coacting with materials elevated by said revolving disk to divert the materials over said rim, and means arranged to rotate said flat disk.

2. An unloading assembly as set forth in claim 1 wherein said arm sections are provided with cylindrical mating portions connected in rotatable telescopic relation with each other.

3. An unloader assembly as set forth in claim 2 wherein said means arranged to rotate said flat disk includes a longitudinally extensible drive shaft journalled in said arm to extend lengthwise thereof, a motor mounted on the pivoted end of said arm and driving said drive shaft, and gearing connecting said drive shaft and flat disk.

4. In a meat cutting machine having a bowl revolvable about a vertical axis and having a concentric trough which is generally semicircular in cross section, a bed rotatably supporting said bowl and having a portion arranged adjacent the outer rim of said trough, and a stationary structure arranged above the center of the bowl, the combination therewith of means for scraping the interior walls of said trough, comprising an arcuate flexible blade extending transversely of said trough in contact with the interior walls thereof, a connection between one end of said blade and said bed, and a connection between the other end of said blade and said stationary structure, one of said connections comprising a member forming a downwardly opening socket arranged above the corresponding end of said blade, a stem guided for vertical movement in said socket, spring means in said socket and biasing said stem downwardly, and means limiting the downward movement of said stem.

References Cited in the file of this patent

UNITED STATES PATENTS

| | | |
|---|---|---|
| 292,550 | Fairly | Jan. 29, 1884 |
| 347,408 | Williams | Aug. 17, 1886 |
| 1,127,587 | Carlin | Feb. 9, 1915 |
| 1,535,794 | Schmidt | Apr. 28, 1925 |
| 1,583,755 | Schmidt | May 4, 1926 |
| 1,724,598 | Johnston | Aug. 13, 1929 |
| 2,043,216 | Van Hooydonk | June 2, 1936 |
| 2,177,600 | Schmidt | Oct. 24, 1939 |
| 2,711,270 | Gulbrandsen | June 21, 1955 |